United States Patent
Kennedy et al.

(10) Patent No.: US 6,649,913 B1
(45) Date of Patent: Nov. 18, 2003

(54) METHOD AND APPARATUS PROVIDING FOCAL PLANE ARRAY ACTIVE THERMAL CONTROL ELEMENTS

(75) Inventors: Adam M. Kennedy, Santa Barbara, CA (US); Michael Ray, Goleta, CA (US); Richard H. Wyles, Santa Barbara, CA (US); Jessica K. Wyles, Santa Barbara, CA (US); William A. Radford, Santa Barbara, CA (US)

(73) Assignee: Raytheon Company, Lexington, MA (US)

( * ) Notice: Subject to any disclaimer, the term of this patent is extended or adjusted under 35 U.S.C. 154(b) by 60 days.

(21) Appl. No.: 10/084,687

(22) Filed: Feb. 26, 2002

(51) Int. Cl.[7] ................................................ G01J 5/00
(52) U.S. Cl. ...................................... 250/352; 250/353
(58) Field of Search ................................. 250/352, 353, 250/339.03, 339.04, 370.15, 349, 330, 332, 342, 338.1, 338.4, 252.1

(56) References Cited

U.S. PATENT DOCUMENTS

| | | | |
|---|---|---|---|
| 5,756,999 A | | 5/1998 | Parrish et al. ............... 250/332 |
| 6,028,309 A | * | 2/2000 | Parrish et al. ............... 250/332 |
| 6,465,785 B1 | * | 10/2002 | McManus ................. 250/338.1 |
| 6,515,285 B1 | * | 2/2003 | Marshall et al. ............ 250/352 |
| 6,538,250 B2 | * | 3/2003 | McManus et al. ........... 250/332 |
| 6,576,904 B1 | * | 6/2003 | Volkening ................. 250/338.2 |

\* cited by examiner

*Primary Examiner*—Constantine Hannaher
*Assistant Examiner*—Otilia Gabor
(74) *Attorney, Agent, or Firm*—William C. Schubert; Glenn H. Lenzen, Jr.

(57) ABSTRACT

A focal plane array (FPA) of infrared (IR) radiation detectors (20), such as an array of microbolometers, includes an active area (20A) containing a plurality of IR radiation detectors, a readout integrated circuit (ROIC) (12) that is mechanically and electrically coupled to the active area and, disposed on the ROIC, a plurality of heater elements (30A) that are located and operated so as to provide a substantially uniform thermal distribution across at least the active area. The FPA further includes a plurality of temperature sensors (30B), individual ones of which are spatially associated with one of the heater elements for sensing the temperature in the vicinity of the associated heater element for providing closed loop operation of the associated heater element. In one embodiment pairs of the heater elements and associated temperature sensors are distributed in a substantially uniform manner across at least a top or a bottom surface of the ROIC, while in another embodiment pairs of the heater elements and associated temperature sensors, or only the heater elements, are distributed in accordance with a predetermined thermal profile of the FPA. The plurality of heater elements may each be composed of a silicon resistance, and the plurality of temperature sensors may each be each composed of a silicon temperature sensor.

19 Claims, 4 Drawing Sheets

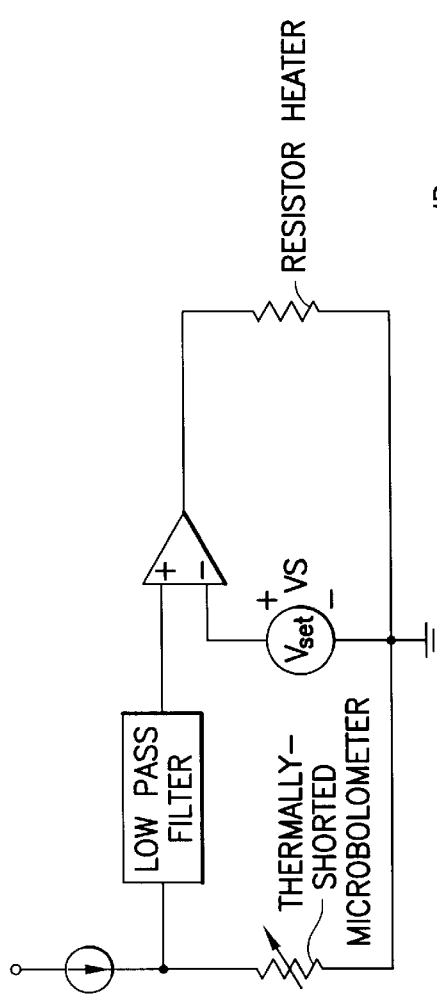
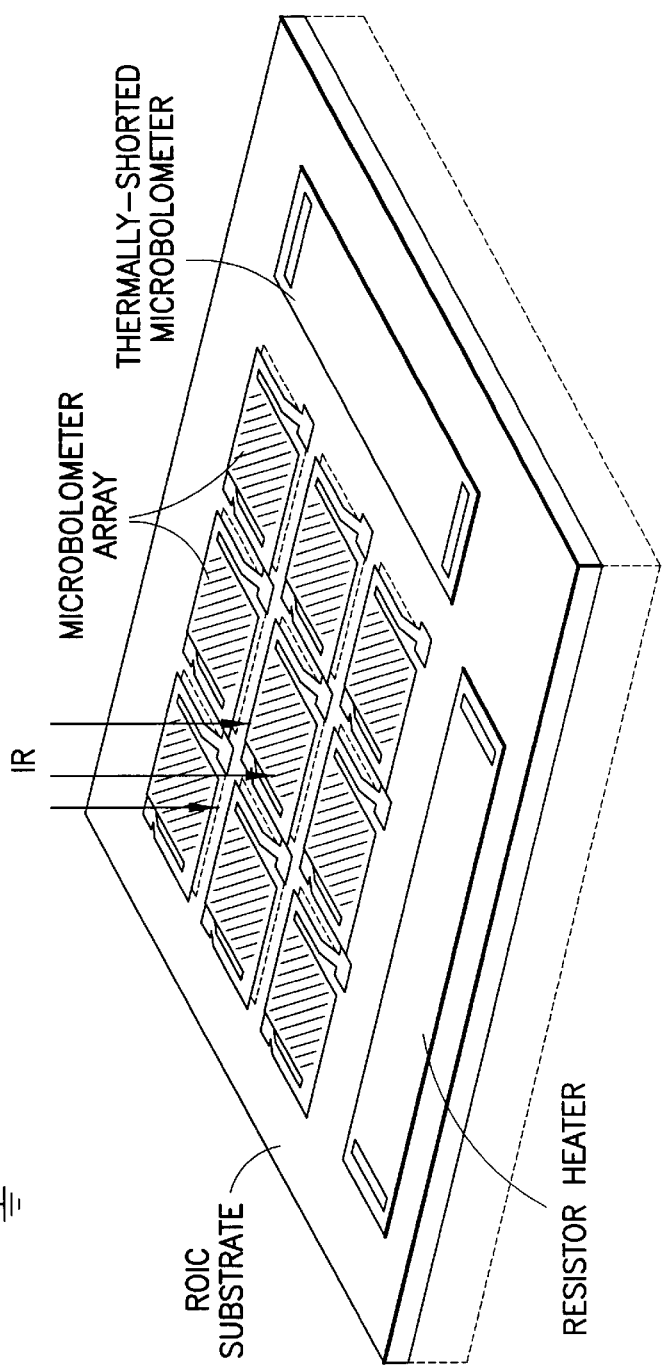
FIG.5A
PRIOR ART
FIG.5B
PRIOR ART

METHOD AND APPARATUS PROVIDING FOCAL PLANE ARRAY ACTIVE THERMAL CONTROL ELEMENTS

TECHNICAL FIELD

These teachings relate generally to detectors of electromagnetic radiation and, more specifically, relate to focal plane arrays (FPA) of infrared (IR) radiation detectors, preferably microbolometer IR detectors, that are not cryogenically cooled (i.e., that are uncooled) during operation.

BACKGROUND

Thermal stability is an important consideration in the operation of uncooled FPA, such as FPAs that employ silicon-based microbolometer detection elements. The silicon microbolometer is inherently very sensitive to changes in temperature, which make its use as a detector of thermal energy particularly attractive. In an ideal case, all thermal inputs to the microbolometer array, with the exception of the scene being viewed, are identical. Thus, if the FPA were viewing a uniform black body, all of the microbolometers would be at exactly the same temperature and would have identical outputs. However, in practice it is impossible to achieve a uniformity of temperature distribution across the microbolometer array, resulting in the generation of a spatial non-uniformity thermal noise component and offset in the output signals of the FPA.

It can be shown that the thermal variations within a detector assembly containing the FPA and an associated readout integrated circuit (ROIC) can be in a typical range of about 1 K to about 2 K, for a given heat load and thermoelectric cooler operational temperature (e.g., 300 K). It can be further demonstrated that the actual thermal variation can be influenced by a number of factors, including the thermal conductivity of an adhesive bondline between the detector assembly and other components, such as a motherboard, as well as any variation in temperature along the thermal electric cooler, variations in the quality of the attachment of a vacuum package that contains the detector assembly to its mounting surface, as well as the magnitude of a thermal gradient between the detector assembly operating temperature and the environmental temperature, such as may occur when operating in a high ambient temperature environment.

It is known in the art to use the thermal electric or other type of cooler to cool the microbolometer array to an (ideally) uniform temperature. It is also known to use a separate resistor/heater element in an attempt to equilibrate the temperature across the FPA. The use of the separate thermal electric cooler or the resistor/heater element, however, increases the cost, complexity and volume requirements of the overall detector assembly.

It is also known in the art to employ high thermal conductivity materials, such as copper and aluminum nitride, in an attempt to smooth out thermal spatial variations across the FPA. However, this approach can also suffer from the problems inherent in the thermal electric cooler or resistor/heater approaches and, furthermore, makes no provision for the possibility of the thermal spatial variations changing during operation.

In U.S. Pat. No. 5,756,999, "Methods and Circuitry for Correcting Temperature-Induced Errors in Microbolometer Focal Plane Array", W. J. Parrish and J. T. Woolaway describe various techniques for the correction of temperature-induced non-uniformities in the response characteristics of microbolometers in an IR-FPA. Referring to FIGS. 5A and 5B, in this prior art approach a thermally-shorted microbolometer is employed to sense the substrate temperature, and circuitry is used to drive an on-ROIC resistor heater to heat the ROIC substrate to a constant temperature. A voltage source (VS) is used to set the desired ROIC substrate temperature.

As can be appreciated, this approach does not adequately address the problem of localized temperature differences that typically exist across the ROIC. For example, and referring to FIG. 5B, it can be seen that those microbolometers that are nearest to the resistor heater will most likely be maintained at a temperature that differs from the microbolometers that are furthest from the resistor heater. In addition, the significant spatial separation between the temperature sensor (i.e., the thermally-shorted microbolometer) and the resistor heater element may result in a less than optimum tracking of the temperature.

SUMMARY OF THE PREFERRED EMBODIMENTS

The foregoing and other problems are overcome, and other advantages are realized, in accordance with the presently preferred embodiments of these teachings.

A focal plane array (FPA) of infrared (IR) radiation detectors, such as an array of microbolometers, includes an active area comprised of a plurality of IR radiation detectors, a readout integrated circuit (ROIC) that is mechanically and electrically coupled to the active area and, disposed on the ROIC, a plurality of heater elements that are located and operated so as to provide a substantially uniform thermal distribution across at least the active area. The FPA further includes a plurality of temperature sensors, individual ones of which are spatially associated with one of the heater elements for sensing the temperature in the vicinity of the associated heater element for providing closed loop operation of the associated heater element. In one embodiment pairs of the heater elements and associated temperature sensors are distributed in a substantially uniform manner across at least a top or a bottom surface of the ROIC, while in another embodiment pairs of the heater elements and associated temperature sensors, or only the heater elements, are distributed in accordance with a predetermined thermal profile of the FPA. The plurality of heater elements may each be comprised of a silicon resistance, and the plurality of temperature sensors may each be each comprised of a silicon temperature sensor.

These teachings thus provide in one aspect a FPA of radiation detectors that includes an active area containing an array of microbolometers; a ROIC that is mechanically and electrically coupled to the active area and a plurality of temperature sensors and heater elements operating in a closed loop manner for substantially minimizing a temperature gradient across at least the active area.

BRIEF DESCRIPTION OF THE DRAWINGS

The foregoing and other aspects of these teachings are made more evident in the following Detailed Description of the Preferred Embodiments, when read in conjunction with attached Drawing Figures, wherein:

FIGS. 5A and 5B illustrate a prior art approach to heating a ROIC substrate using a substrate temperature sensor and on-ROIC resistor heater to heat the ROIC substrate to a constant temperature.

DETAILED DESCRIPTION OF THE PREFERRED EMBODIMENTS

Figure 1:
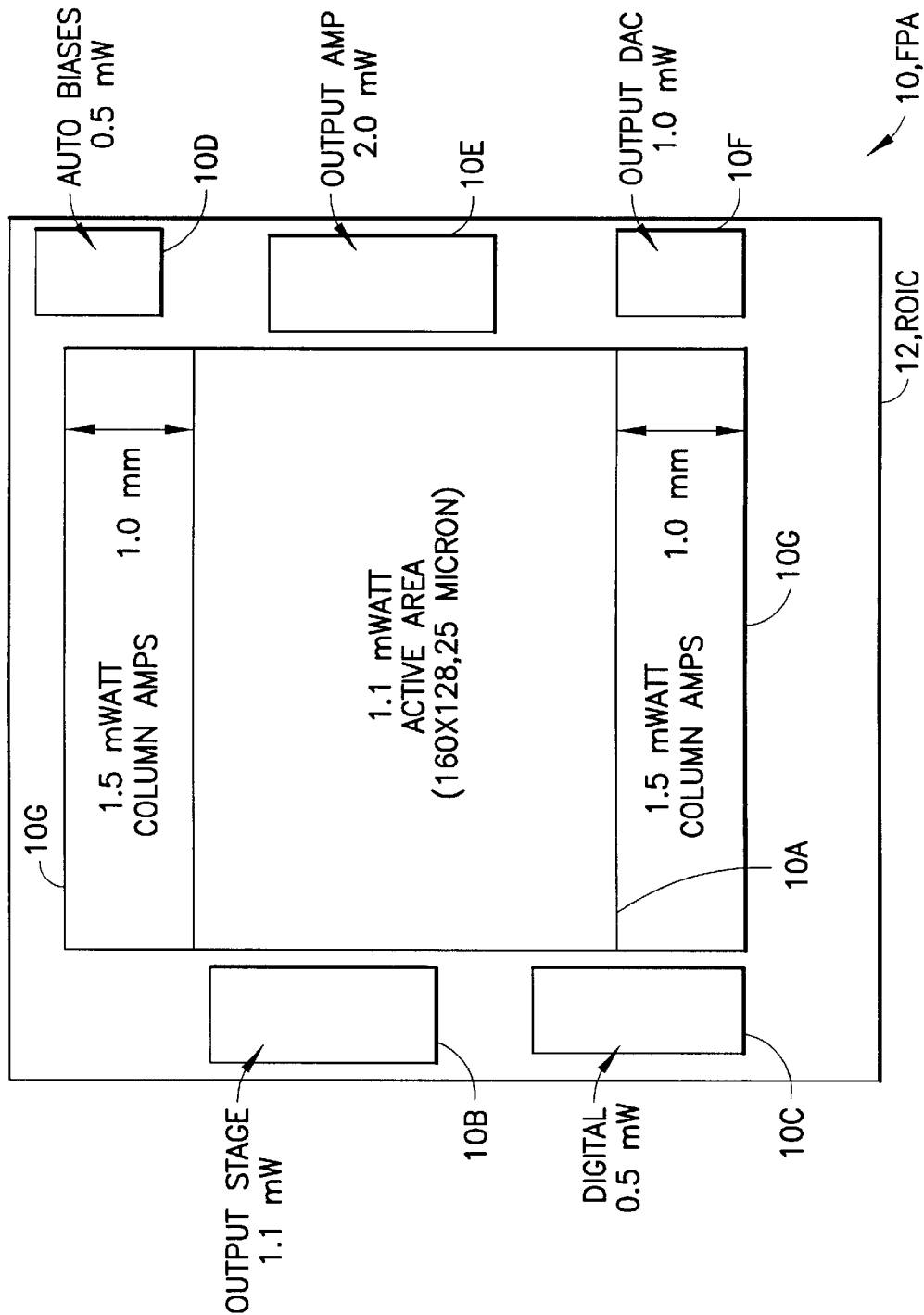
FIG. 1 is a top, simplified view of an exemplary FPA showing the distribution of different thermal loads.

Referring to FIG. 1, there is shown a top, simplified view of an exemplary FPA 10 showing the distribution of different thermal loads. By way of example, the FPA 10 includes a plurality of discrete functional areas, including an active, IR radiation active sensing array 10A that is mounted to, or that is integral with a Readout Integrated Circuit (ROIC) 12. For an uncooled microbolometer embodiment the active sensing array 10A and the ROIC 12 may be silicon-based circuits. In this case the microbolometers may each occupy a 50 micron square area, or smaller, and may be constructed as air bridge structures, to provide thermal isolation from the ROIC substrate, that are coated with an IR absorbing layer. The resistance of the microbolometer structure changes with its temperature, which is in turn influenced by the amount of IR radiation that impinges on the microbolometer structure. The change in resistance provides a measurable change in the current that flows through the microbolometer, in a well known manner. In other embodiments the active sensing array 10A may be comprised of other materials and/or other types of IR detectors.

The ROIC 12, typically fabricated from a silicon substrate, contains, by example, an output stage 10B, a digital logic block 10C, an automatic biasing (auto biases) block 10D, an output amplifier 10E, an output digital-to-analog converter (DAC) 10F and column amplifiers 10G. During operation, these various functional areas dissipate some characteristic amount of power. For example, the output amplifier 10E may dissipate about 2mW, while the digital logic block 10C may dissipate about 0.5 mW. These localized areas of different power dissipation result in the generation of regions of different temperature in the FPA 10, which further results in the generation of thermal gradients across the active area 10A. These thermal gradients induce the generation of the undesirable spatial non-uniformity thermal noise component in the output signals of the FPA 10, as was discussed previously.

Figure 2:
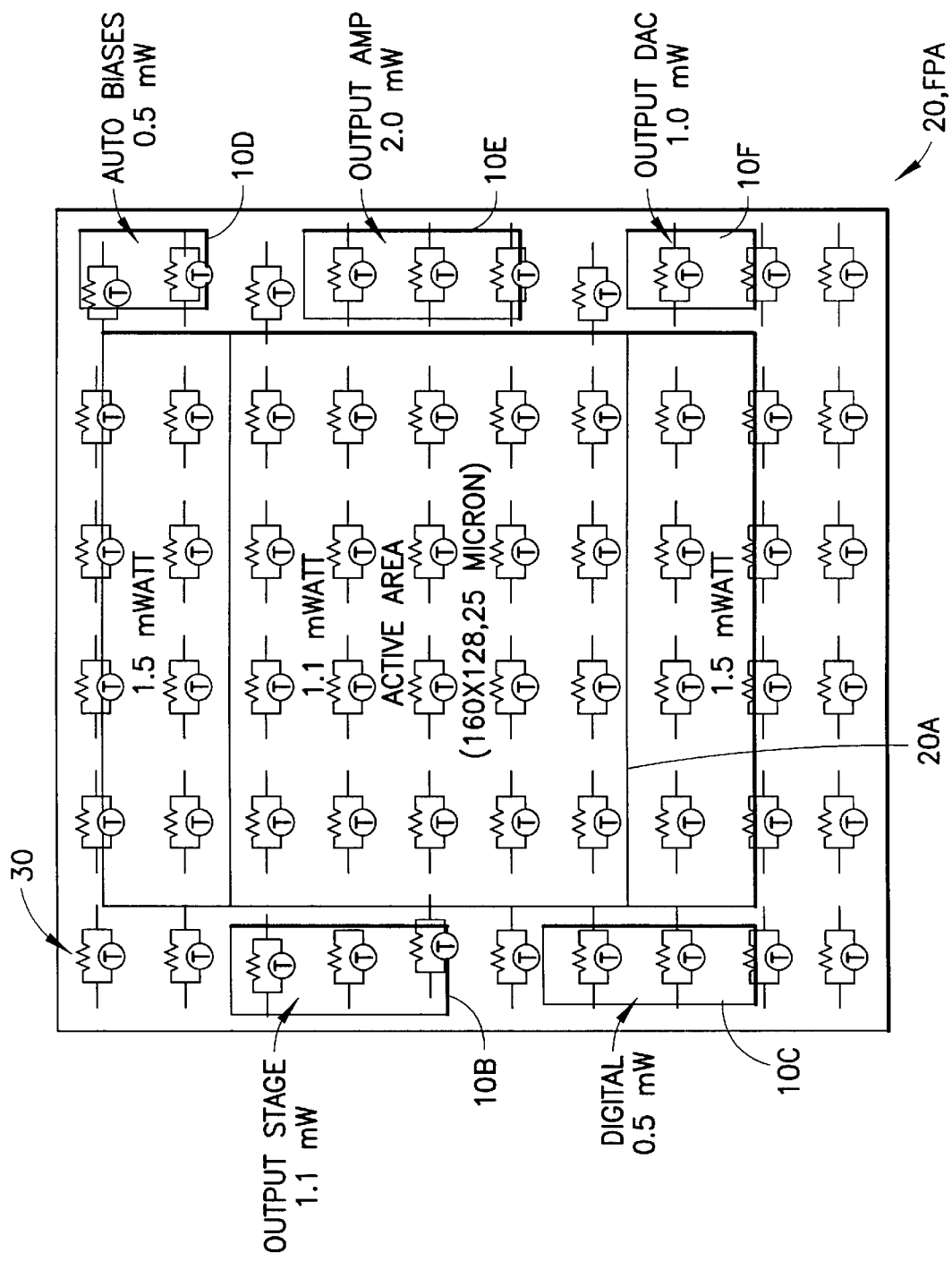
FIG. 2 is a top, simplified view of the exemplary FPA of FIG. 1, with the addition of a plurality of spatially distributed temperature sensing and heat generating circuit elements in accordance with an embodiment of these teachings.

FIG. 2 shows an improvement to the FPA in accordance with an aspect of these teachings. More specifically, FIG. 2 shows an improved FPA 20 that is constructed to include a plurality of spatially distributed temperature sensing and heat generating circuit elements 30 in accordance with an embodiment of these teachings. The circuit elements 30 maybe incorporated directly into the circuitry of the FPA 20 and may be distributed in a spatially uniform manner. That is, the spacing between the circuit elements 30 may be approximately uniform across the FPA. Alternatively, the circuit elements 30 may be spatially distributed in a predetermined manner as a function of the distribution of the heat dissipating regions of the FPA 20, that is, in accordance with a predetermined thermal profile. In either case the presence of the plurality of the elements 30 is intended to make the temperature across at least the active sensing area 20A as uniform as possible. In general, the use of the elements 30 enables temperature control to be accomplished spatially across the active area 20A as the local and environmental temperature changes, as well as to accommodate changes in scene input to the active area 20A.

That is, a plurality of temperature sensors 30B are provided, where individual ones of the temperature sensors 30B are spatially associated with one of a plurality of heater elements 30A for sensing the temperature in the vicinity of the associated heater element 30A for providing closed loop operation of the associated heater element 30A.

In the presently preferred embodiment the circuit elements 30 are incorporated into the circuitry of the ROIC 12, and thus a portion of the elements 30 may lie beneath the active area 20A. The elements 30 may be integrated into the ROIC 12 prior to the fabrication of the various readout circuitry, such as the digital section 10C and the output amplifier 10E, or the elements 30 may be fabricated along with the fabrication of the ROIC readout circuitry, and/or at the time the active area 10A is fabricated onto the ROIC substrate. The circuit elements 30 may be disposed adjacent to or on the top surface of the ROIC 12, or on the bottom surface (i.e., the surface opposite the surface having the active area 10A.) The circuit elements 30 may comprise discrete resistances or resistors that function as heater elements 30A and temperature sensors 30B, and may be embodied as a silicon-based temperature sensing element and a silicon-based resistor. In other embodiments a plurality of nichrome heater elements 30A may be employed. When the temperature sensor 30B senses a change in temperature the current flow through the associated resistor 30A is varied accordingly so as to increase or decrease the current flow, and to thereby increase or decrease the power dissipated by the resistor 30A. For example, and in a self-regulating type of embodiment, if the sensor 30B detects a decrease in temperature at the location of the sensor 30B, the current through the associated resistance 30A is increased, thereby increasing the power dissipated by the resistance 30A and thus the amount of heat coupled into the FPA 20 at that location. Conversely, if the sensor 30B detects an increase in temperature at the location of the sensor 30B, the current through the associated resistance 30A is decreased, thereby decreasing the power dissipated by the resistance 30A and allowing a localized cooling of the FPA 20 at that location.

The sensor 30B may be constructed of a negative temperature coefficient of resistance (TCR) type of material that is placed in parallel with the resistor 30A. In this case an increase in temperature increases the current flow through the sensor 30B, and this current flow is increased at the expense of the current flow through the parallel-connected resistance 30A, and vice versa. Alternatively, the sensor 30B may be constructed of a positive TCR type of material that is placed in series with the resistor 30A. In this case an increase in the temperature causes the current flow through the sensor 30B to decrease, thereby also decreasing the current flow through the series-connected resistance 30A, and vice versa.

Figure 4:
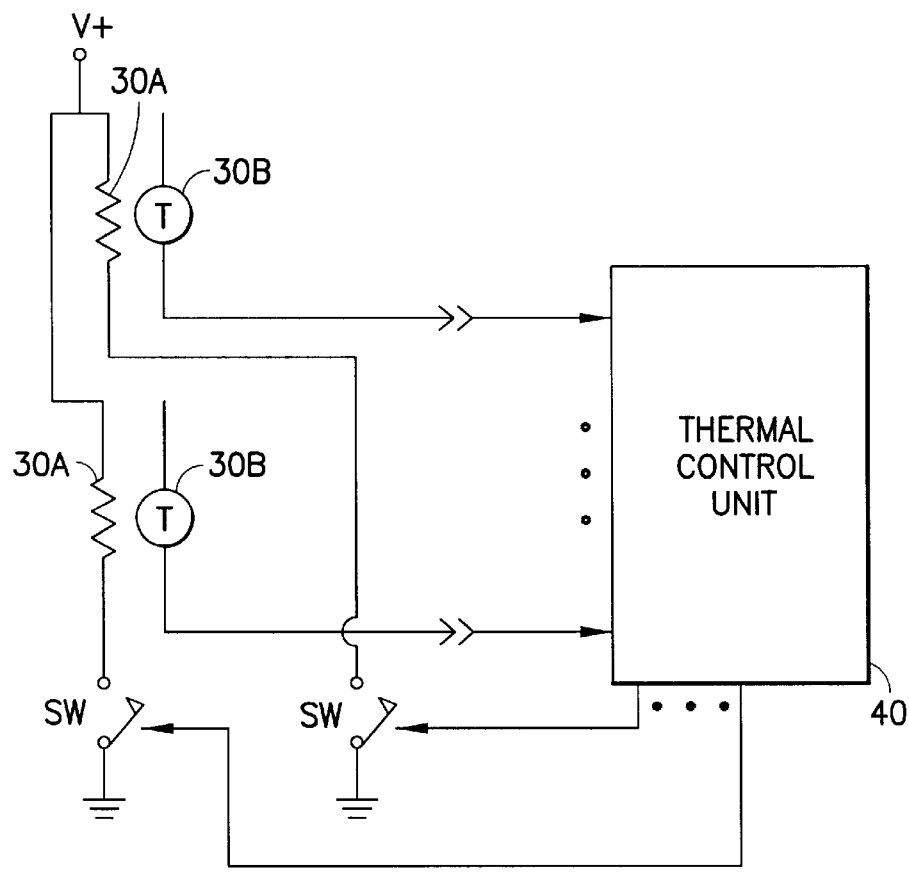
FIG. 4 is a simplified block diagram of a thermal control unit coupled to a FPA in accordance with an aspect of these teachings.

In a further embodiment of these teachings, and referring to FIG. 4, the temperature sensors 30B may be coupled to a thermal control network or unit 40, which may form a part of the ROIC 12 or that may be provided external to the ROIC 12. In this case the temperature sensors 30B may be considered to function in a manner analogous to a plurality of distributed thermostats that are read by the thermal control unit 40, and which then controls the current flow through the resistors 30A accordingly to provide a substantially uniform temperature across the active area 20A of the FPA 20. The current flow through the resistors 30B may be controlled by providing a plurality of switches (SW), such as transistor switches, and opening and closing the switches selectively as a function of the local temperature sensed by the sensors 30B. The thermal control unit 40 may operate so as to attempt to cause all of the temperature sensors 30B to indicate the same ROIC substrate temperature, thereby equilibrating the FPA 20 temperature, or more sophisticated thermal control algorithms may be employed, such as to provide a predetermined non-spatially uniform temperature profile across certain portions of the ROIC substrate, while maintaining the active area 10A at one substantially constant and uniform temperature.

It should be apparent that in some applications it may be desirable to completely interrupt the source of heater current to the heater resistances 30A, such as by using the switches (SW) of FIG. 4, while in other applications it may be desirable to control the heater current from full on to full off in a linear fashion, to thereby provide finer control over the amount of heat that is generated. One consideration may be the amount of circuit noise that can be tolerated by the cycling of the heater resistances 30A, as well as the locations of the heater resistances 30A (e.g., their proximity to the readout circuitry of the ROIC 12.) Placing the heater resistances 30A on the back or bottom-side of the ROIC 12 substrate can be used to reduce the amount of generated electrical noise, although the heating effect may be more difficult to control due to the larger thermal resistance represented by the thickness of the ROIC 12 substrate.

The temperature sensing elements 30B in the thermal regulation control loops do not require absolute temperature calibration, as it is more important that they be capable of sensing a relative change in temperature.

Figures 3A, 3B:
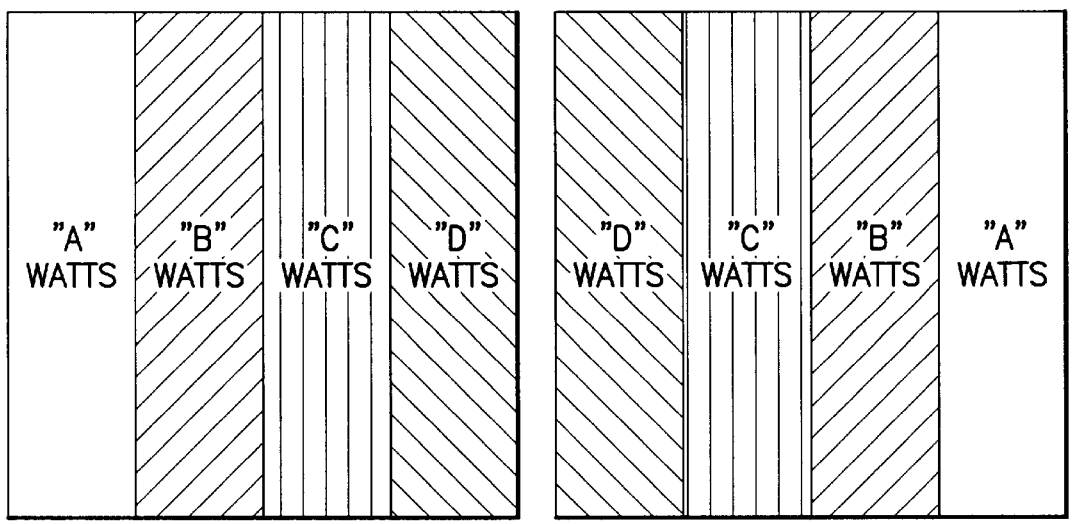
FIG. 3A shows an exemplary FPA heat distribution profile.
FIG. 3B shows the corresponding distribution of temperature compensation circuitry in accordance with a further embodiment of these teachings.

Referring to FIGS. 3A and 3B, in accordance with an aspect of these teachings the temperature sensors 30B and heater resistances 30A may be spatially distributed to provide a heat distribution that is the inverse of the FPA 10 normal operational heat distribution. More specifically, FIG. 3A hows an exemplary FPA 10 heat distribution profile, where the FPA 10 surface area is characterized by four regions A–D of differing heat dissipation (i.e., A Watts, B Watts, etc.) FIG. 3B shows the corresponding thermal profile due to the distribution of temperature compensation circuit elements 30. Assuming for this simplified example that A Watts>B Watts>C Watts>D Watts, then it can be seen that the temperature compensation circuit elements 30, in accordance with FIG. 3B, are spatially distributed so as to generate a thermal profile that is the opposite of the thermal profile generated by the operational power dissipation of the FPA 10 as shown in FIG. 3A. The end result is that a combination of FIGS. 3A and 3B causes an (ideally) uniform temperature distribution across the FPA 20, without the generation of undesirable temperature gradients that would adversely affect the operation of the FPA 20.

One advantage of the embodiment of FIG. 3B is that the temperature sensing elements 30B may not be required, as the steady-state thermal profile of the FPA 10 is determined a priori, and the heater resistances 30A are located accordingly. However, this approach may not be optimum if variations in the temperature of the FPA 10 are expected to occur during operation and/or if it is desired to compensate for changes in the heat load due to changes in arriving scene thermal energy. If temperature variations are expected to occur, then it maybe more desirable to provide the temperature sensors 30B as well.

It is also within the scope of these teachings to place only heater resistances 30A at certain locations, and to place the heater resistance/temperature sensor circuit elements 30 at other locations where the existence of even a small temperature gradient would be more detrimental. It is also within the scope of these teachings to provide the regular uniform spacing of circuit elements 30 (or just the heater resistances 30A) within one or more areas of the ROIC 12, and to cluster or otherwise provide a non-uniform spacing between circuit elements 30 within other areas (or area) of the ROIC 12.

While described in the context of presently preferred embodiments of these teachings, those skilled in the art should appreciate that changes in form and details thereof made be made without departing from the scope and the spirit of this invention.

What is claimed is:

1. A focal plane array (FPA) of infrared (IR) radiation detectors, comprising:
   an active area comprised of a plurality of IR radiation detectors;
   a readout integrated circuit (ROIC) that is mechanically and electrically coupled to said active area; and
   disposed on said ROIC, a plurality of heater elements that are located and operated so as to provide a substantially uniform temperature across at least said active area.

2. A FPA as in claim 1, and further comprising a plurality of temperature sensors individual ones of which are spatially associated with at least one of said heater elements for sensing the temperature in the vicinity of said associated heater element for providing closed loop operation of said associated heater element.

3. A FPA as in claim 2, wherein pairs of said heater elements and associated temperature sensors are distributed in a substantially uniform manner across at least a first surface of said ROIC.

4. A FPA as in claim 3, wherein said first surface is a surface that underlies said active area.

5. A FPA as in claim 3, wherein said first surface is a surface that is opposite a second surface that underlies said active area.

6. A FPA as in claim 3, wherein pairs of said heater elements and associated temperature sensors are distributed in accordance with a predetermined thermal profile of said FPA across at least a first surface of said ROIC.

7. A FPA as in claim 6, wherein said first surface is a surface that underlies said active area.

8. A FPA as in claim 6, wherein said first surface is a surface that is opposite a second surface that underlies said active area.

9. A FPA as in claim 2, wherein said plurality of heater elements are each comprised of a silicon resistance, and wherein said plurality of temperature sensors are each comprised of a silicon temperature sensor.

10. A FPA as in claim 1, wherein said plurality of heater elements are distributed in accordance with a predetermined thermal profile of said FPA across at least a first surface of said ROIC.

11. A FPA as in claim 1, wherein said plurality of IR radiation detectors are each comprised of a microbolometer structure.

12. A method for operating a focal plane array (FPA) of infrared (IR) radiation detectors, comprising:
   providing the FPA so as to be comprised of an active area comprised of a plurality of IR radiation detectors and a readout integrated circuit (ROIC) that is mechanically and electrically coupled to the active area, the FPA exhibiting a non-uniform thermal distribution during operation; and during the operation of the FPA, operating a plurality of heater elements that are disposed on the ROIC so as to provide a substantially uniform distribution of temperature across at least the active area.

13. A method as in claim 12, where the step of operating also operates a plurality of temperature sensors individual ones of which are spatially associated with at least one of the heater elements for sensing the temperature in the vicinity of the associated heater element for providing closed loop operation of the associated heater element.

14. A method as in claim 13, wherein pairs of the heater elements and associated temperature sensors are distributed in a substantially uniform manner across at least one surface of the ROIC.

15. A method as in claim 13, wherein pairs of the heater elements and associated temperature sensors are distributed in accordance with a predetermined thermal profile of the FPA across at least a first surface of said ROIC.

16. A method as in claim 12, wherein the plurality of IR radiation detectors are each comprised of a microbolometer structure.

17. A focal plane array (FPA) of radiation detectors, comprising:

an active area comprised of an array of microbolometers;

a readout integrated circuit (ROIC) that is mechanically and electrically coupled to said active area; and a plurality of temperature sensors and heater elements coupled together for operating in a closed loop manner for substantially minimizing a temperature gradient across at least said active area.

18. A FPA as in claim 17, wherein pairs of said heater elements and associated temperature sensors are distributed across at least a first surface of said ROIC in a substantially uniform manner.

19. A FPA as in claim 17, wherein pairs of said heater elements and associated temperature sensors are distributed across at least a first surface of said ROIC in accordance with a predetermined thermal profile.

* * * * *